United States Patent
Rykaert et al.

(10) Patent No.: US 8,096,209 B2
(45) Date of Patent: Jan. 17, 2012

(54) SPEED RATIO SHIFT CONTROL DEVICE FOR VEHICLE, PROXIMATE THE STEERING WHEEL

(75) Inventors: Jean-Jacques Rykaert, Villemomble (FR); Didier Fandart, Chevreuse (FR)

(73) Assignee: Renault S.A.S., Boulogne-Billancourt (FR)

( * ) Notice: Subject to any disclaimer, the term of this patent is extended or adjusted under 35 U.S.C. 154(b) by 499 days.

(21) Appl. No.: 11/915,455

(22) PCT Filed: May 24, 2006

(86) PCT No.: PCT/FR2006/050473
§ 371 (c)(1),
(2), (4) Date: Nov. 11, 2008

(87) PCT Pub. No.: WO2007/026085
PCT Pub. Date: Mar. 8, 2007

(65) Prior Publication Data
US 2009/0194398 A1    Aug. 6, 2009

(30) Foreign Application Priority Data
May 26, 2005    (FR) ...................................... 05 05300

(51) Int. Cl.
*B62D 1/04*    (2006.01)
(52) U.S. Cl. ......................................................... 74/552
(58) Field of Classification Search ..................... 74/552, 74/484 R, 473.1; 280/779
See application file for complete search history.

(56) References Cited

U.S. PATENT DOCUMENTS

| | | | | |
|---|---|---|---|---|
| 2,269,970 A | * | 1/1942 | Bundy et al. | 74/484 R |
| 2,841,028 A | * | 7/1958 | Adloff | 74/484 R |
| 3,853,019 A | * | 12/1974 | McAdams | 74/473.28 |
| 4,993,278 A | * | 2/1991 | Nakanishi | 74/484 R |
| 6,076,414 A | * | 6/2000 | Tabata et al. | 74/335 |
| 6,120,412 A | * | 9/2000 | Fujinuma | 477/99 |
| 6,327,928 B1 | * | 12/2001 | Bowerman et al. | 74/473.31 |
| 6,409,287 B1 | * | 6/2002 | Leach et al. | 303/146 |
| 6,647,822 B2 | * | 11/2003 | Ritchie et al. | 74/473.31 |
| 6,698,308 B2 | * | 3/2004 | Vogel et al. | 74/473.32 |

FOREIGN PATENT DOCUMENTS

| | | |
|---|---|---|
| EP | 1 211 119 | 6/2002 |
| FR | 2 792 085 | 10/2000 |
| FR | 2 855 792 | 12/2004 |

* cited by examiner

*Primary Examiner* — Vicky Johnson
(74) *Attorney, Agent, or Firm* — Oblon, Spivak, McClelland, Maier & Neustadt, L.L.P.

(57) ABSTRACT

A vehicle control device including: a support; a steering member mounted mobile relative to the support; and at least one speed ratio shifting member including a base rigidly fixed to the support and having a single end, the at least one speed ratio shifting member including one part mounted mobile on the base and forming the end.

12 Claims, 4 Drawing Sheets

SPEED RATIO SHIFT CONTROL DEVICE FOR VEHICLE, PROXIMATE THE STEERING WHEEL

BACKGROUND OF THE INVENTION

I. Field of the Invention

The invention relates to gear ratio shift control devices for vehicles.

II. Description of Related Art

Document FR-2 855 792, in the name of the Applicant, discloses a gear ratio shift control device for a vehicle, comprising a support bearing two arms on which control buttons are placed. The buttons are arranged on the rear face of the arms, that is to say the face directed toward the steering wheel and the driver. Using his thumbs and without taking his hands off the steering wheel, the driver can actuate the buttons to modify the vehicle gear ratio.

However, this method of control may prove uncomfortable in certain situations.

BRIEF SUMMARY OF THE INVENTION

An object of the invention is to improve the gear support shift control.

Accordingly, there is provided according to the invention a vehicle control device comprising:

a support;

a steering member mounted movably with respect to the support; and at least one gear ratio shift member comprising a base fastened rigidly to the support and having a single end, the or each gear ratio shift member comprising a part mounted movably on the base and forming said end.

Thus, this arrangement makes it possible to optimize the position of the driver's fingers on the control members. Some of the four fingers of the hand apart from the thumb now serve, instead of the thumb, for control purposes. Moreover, the driver does not necessarily have to pass his fingers completely to the front of the members, that is to say in a plane parallel to the plane of the steering wheel. He only need arrange them in the plane of the front face, which corresponds to a more natural position of the driver's hands when they are placed on the steering wheel. A slightly beveled form of the control members makes it possible to optimize the position of the driver's fingers on these members and thus offers better ergonomics.

The device according to the invention may additionally have at least any one of the following features:

the ratio shift control members extend facing an upper half of the steering member;

the or each control member has a front face extending in a substantially vertical plane, this plane being inclined with respect to the direction of travel of the vehicle, in a direction away from the steering member;

the inclination corresponds to an angle of between 60 and 80°;

the major portion of the movable part extends in the continuation of the base;

the movable part has a curved peripheral edge of which a center of curvature is situated on the same side of the edge as the movable part; and it comprises two gear ratio shift members.

BRIEF DESCRIPTION OF THE DRAWINGS

Other features and advantages of the invention will become apparent from the following description of a preferred embodiment given by way of non-limiting example with reference to the appended drawings, in which.

DETAILED DESCRIPTION OF THE INVENTION

Figure 1:
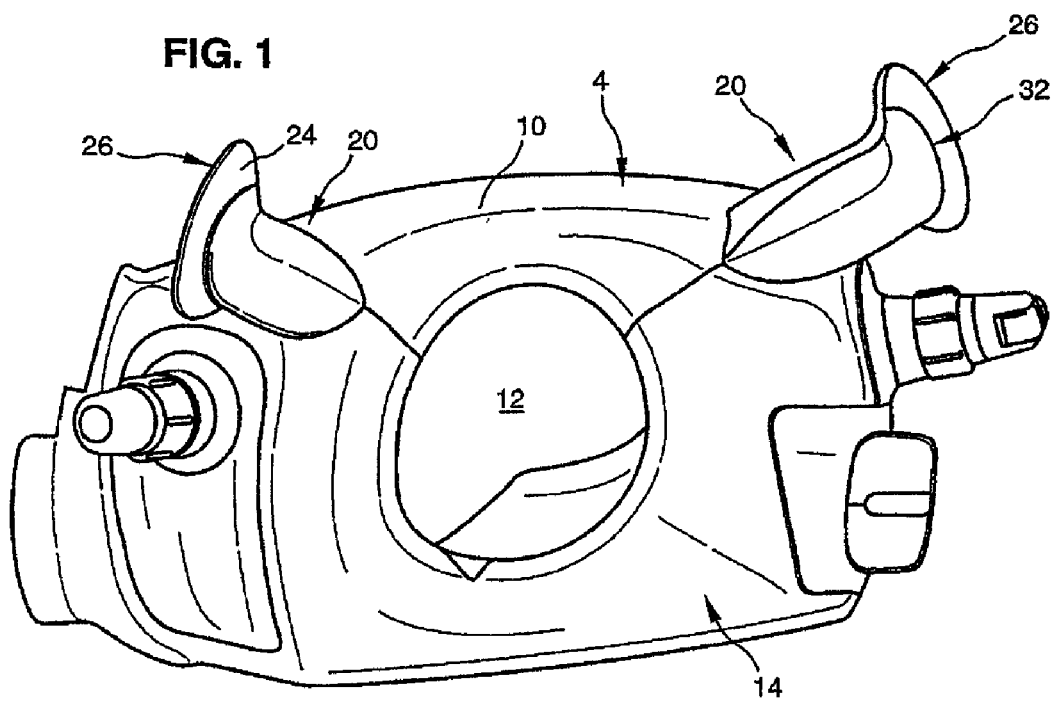
FIGS. 1 and 2 are two perspective views, respectively a rear view and a front view with reference to the direction of travel of the vehicle, of a device according to the invention.
Figure 2:
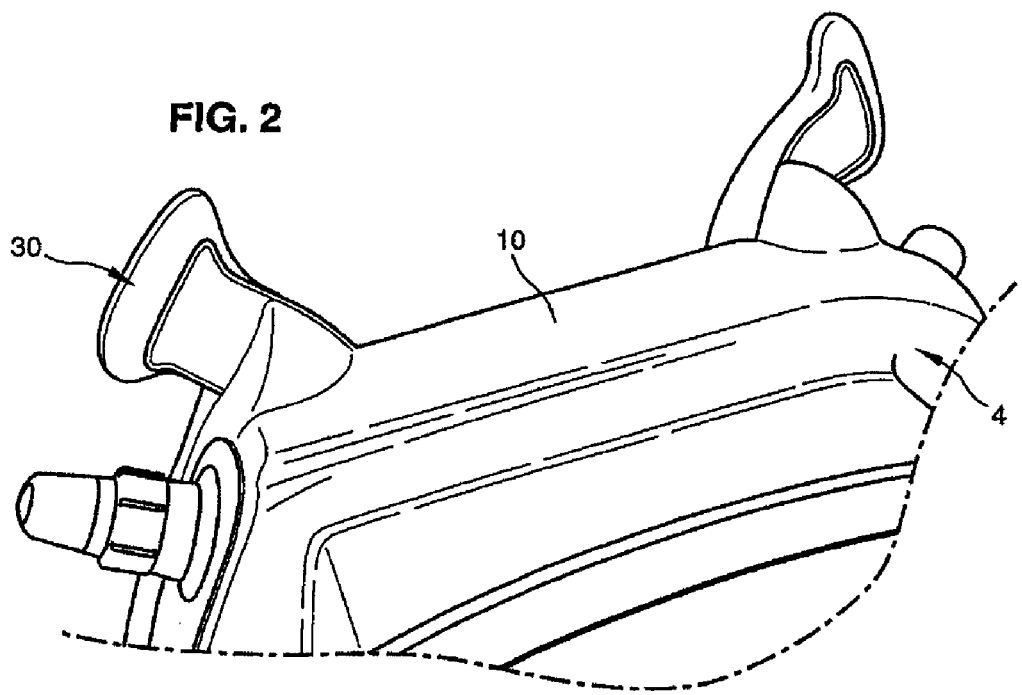

With reference to the figures, the driving system 2 according to the invention in this case comprises a control device 4 and a steering wheel 6. The steering wheel has a conventional circular shape and is intended to be rotatably mounted, with reference to a vehicle dashboard, about its axis 8. The device 4 comprises a support 10 having an orifice 12 at its center through which members 13 of the steering column which is associated with the steering wheel 6 pass. The axis 8 is the axis of this orifice and forms a main axis of the support 10. The steering wheel is mounted movably, in particular rotatably, with respect to the support.

Figure 3:
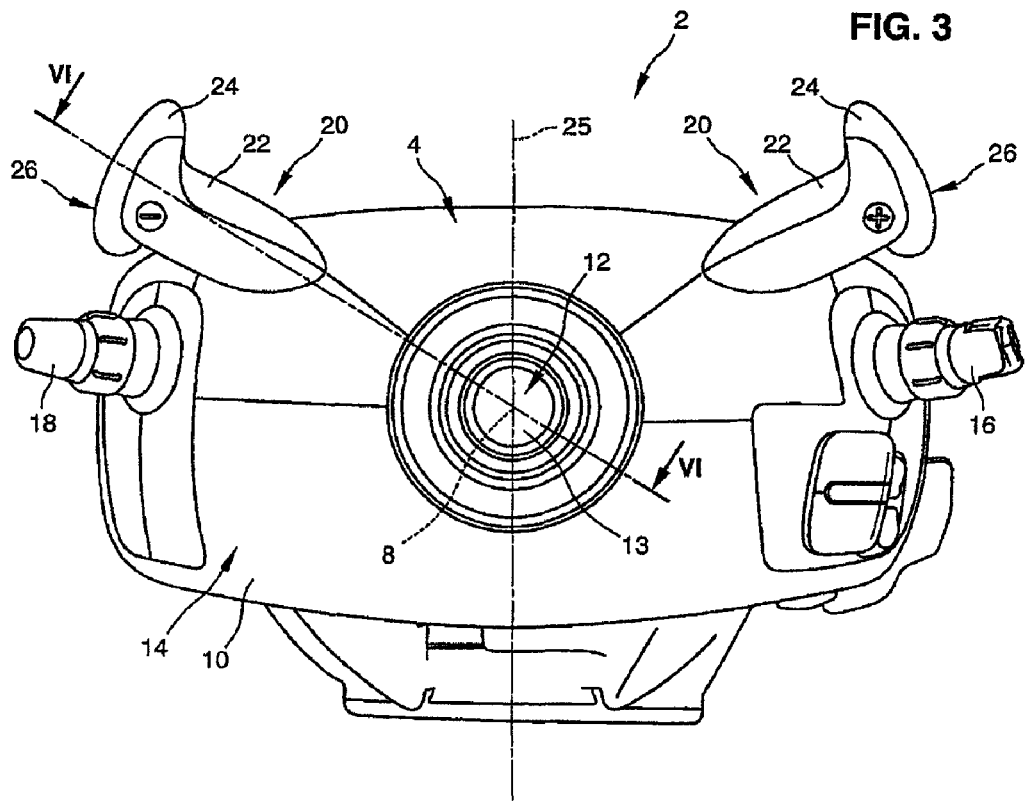
FIGS. 3 to 5 are three views, respectively a rear view, a top view and a left view, of the device shown in FIG. 1 in the presence of a steering wheel.
Figure 4:
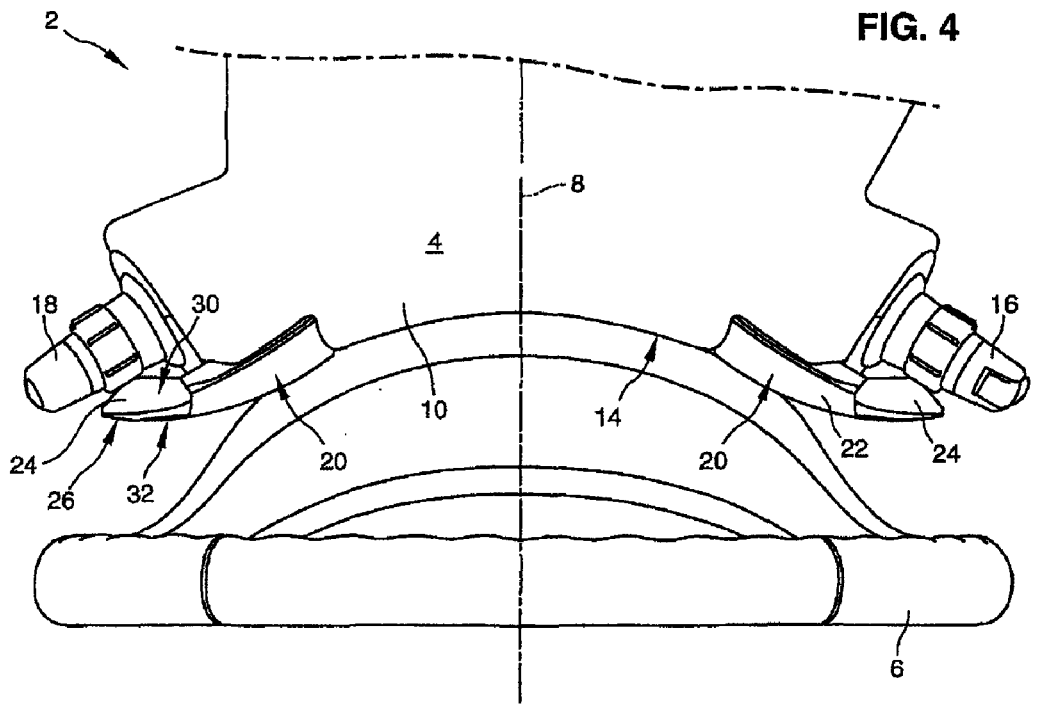
Figure 5:
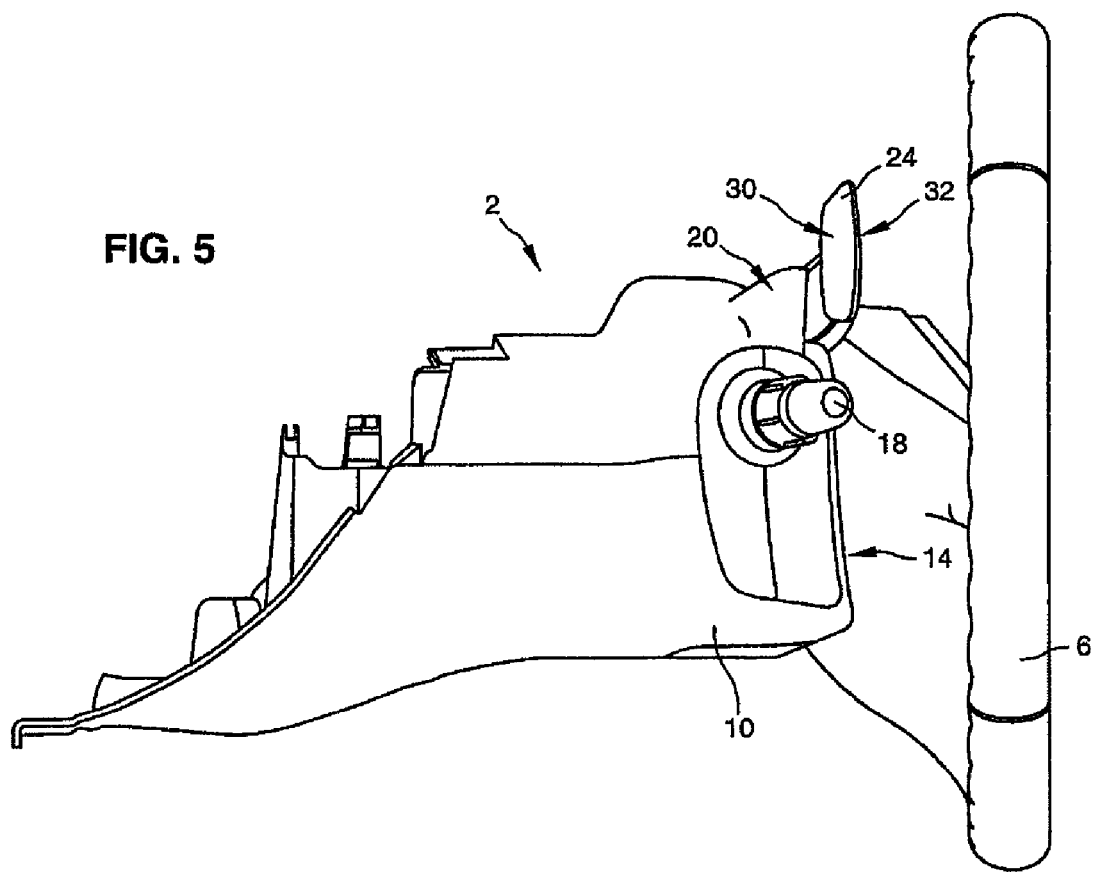
Figure 6:
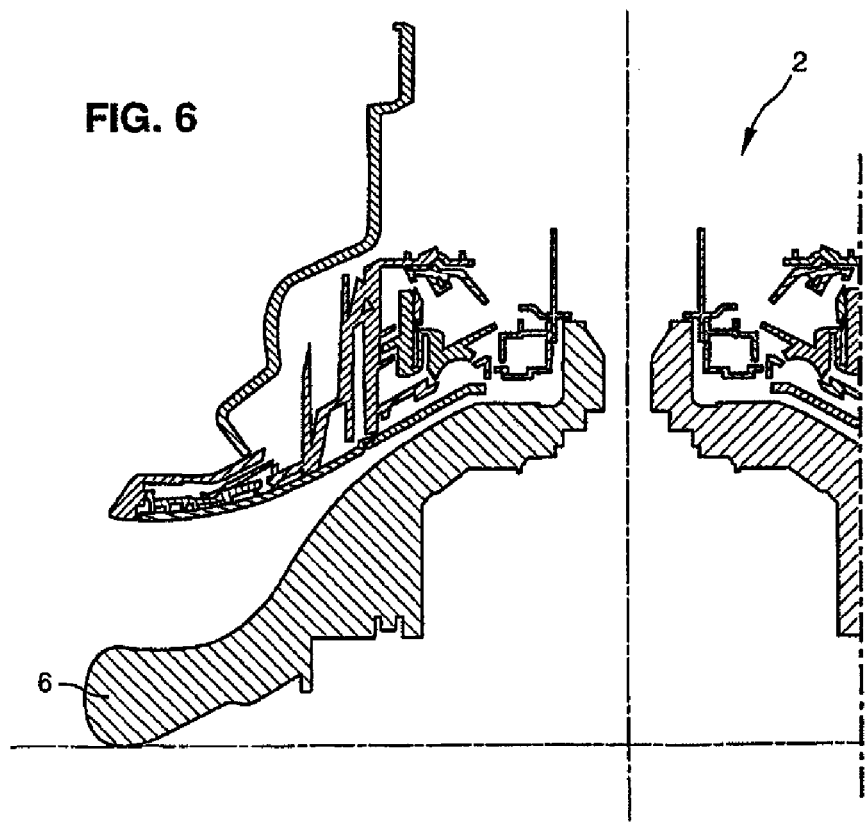
FIG. 6 is a sectional view of the device shown in FIG. 3 on the plane VI-VI.

The support 10 has a rectangular general shape in a rear view as shown in FIG. 3. It consists in this case of a shell whose rear face 14, intended to be situated facing the steering wheel and the driver, has a convex shape in the form of a portion of a sphere whose center of curvature is situated on the same side of this face as the steering wheel, as can be seen in particular from FIG. 4.

The support 10 bears various vehicle control members arranged, for example, on stalks 16 and 18 which project to the left and right from the support on lateral sides thereof.

The device 4 comprises two paddles 20 arranged on an upper edge of the support at the left and right upper corners of the rectangle, respectively. Each paddle 20 in this case comprises an arm or base 22 and a control part 24, formed here by an electric switch connected to an appropriate electronic circuit (not shown). The two paddles are situated facing an upper half of the steering wheel. Each part 24 is rotatably mounted with respect to the fixed arms 22.

The arms 22 are rigidly fastened to the support 10. They have a generally elongate shape and have a longitudinal axis arranged with a radial orientation with respect to the axis 8, and are inclined with respect to the vertical.

The two paddles 20 are symmetrical to one another with respect to a vertical mid-plane 25, passing through the axis 8, of the driving system.

The major portion of each switch extends in the continuation of the base. Each switch 24 has a peripheral edge 26 extending over a part of the switch that is directed away from the arm 22 which bears it. The edge 26 has a curved shape whose center of curvature is situated on the same side of this edge as the switch.

Each control part 24 has a front face 30 and a rear face 32 both extending on opposite sides of the part starting from the edge 26. The rear face 32 is situated in particular facing the steering wheel 6. The rear face 32 generally extends in a plane perpendicular to the axis 8.

Figure 7:
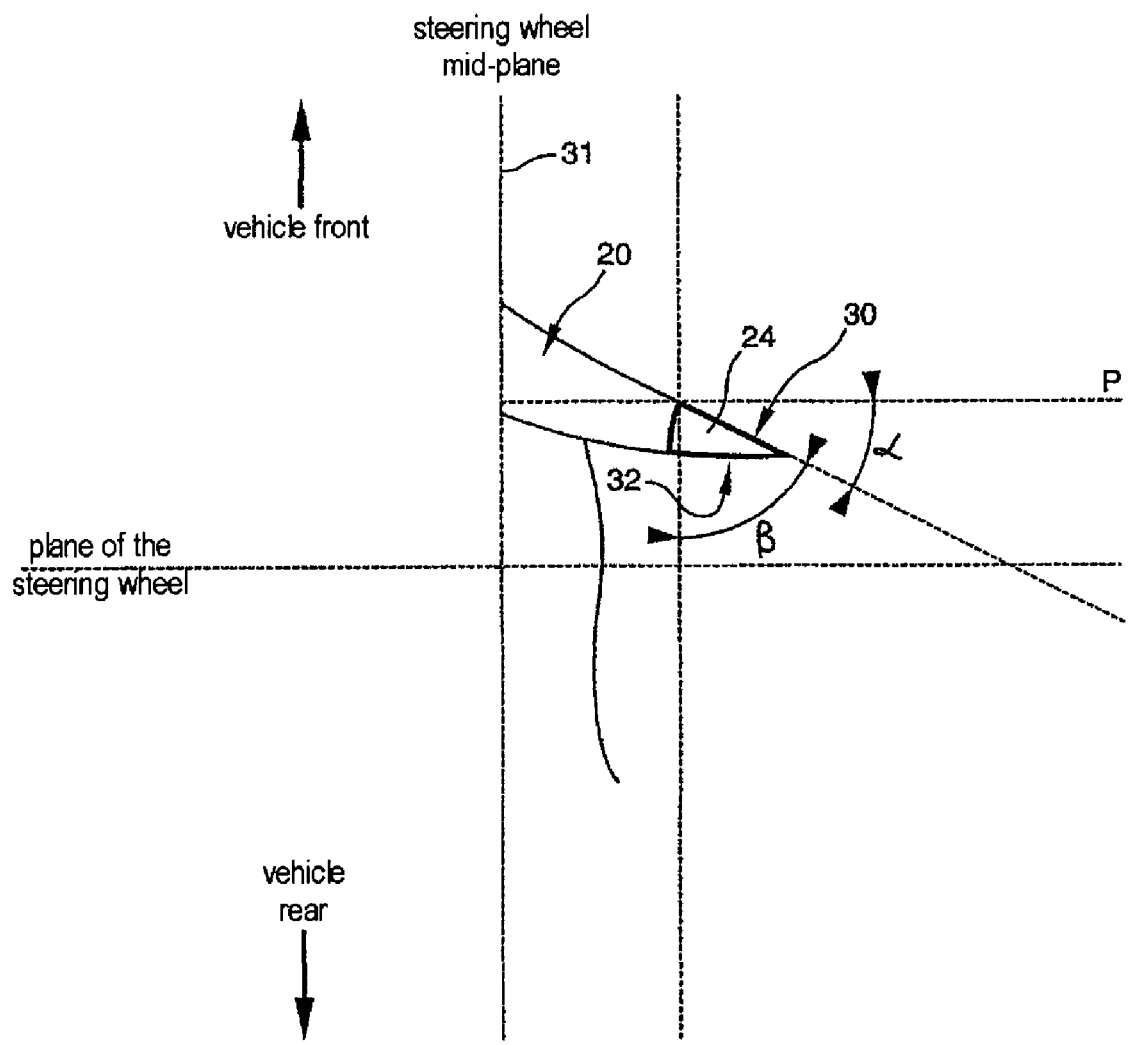
FIG. 7 is a diagram illustrating the orientation of the front face of the gear ratio shift members.

The front face 30 extends in a vertical plane and is inclined with respect to the axis 8 in a direction away from this axis. As illustrated in FIG. 7, the vertical plane of the front face 30 is inclined with respect to the direction of travel 31 of the vehicle in a direction away from the steering wheel. This inclination in this case corresponds to an angle β of between 60 and 80° C. and equal here to 70° C. In other words, the vertical plane of the front face is inclined with respect to a plane P perpendicular to the direction of travel 31, and by an angle α of between 20 and 40° and here equal to 20°.

In the present example, each part 24 is formed by an electric switch such that, when the driver's fingers press on the face 30 while he is holding the steering wheel, this contact commands the switch to modify the gear ratio.

In the present example, the left paddle 20 allows a reduction of the gear or transmission ratio while the right paddle allows an increase thereof.

Given the shape and dimensions of the paddles 20, when the driver has placed his hands on the steering wheel in the recommended ten past ten position, his fingers are naturally in place to push against the switches. For this purpose, the driver places his fingers on the front face 30 and exerts a pushing action using a movement directed substantially toward the rear of the vehicle.

The paddles are designed such that, even if the driver has relatively large hands, he can place at least three fingers on the paddle, thereby enabling it to be actuated in a comfortable manner.

The paddles according to the invention require little space and are small in size. Their integration within a driver's station is relatively straightforward.

The invention makes it possible to shift the gear ratio at the top of the steering column without the driver having to take one of his hands off the steering wheel.

Of course, the existence of the paddles according to the invention does not prevent the vehicle from additionally having a gear ratio shift lever situated on the floor or on the dashboard.

It goes without saying that many modifications may be made to the invention without departing from the scope thereof.

The invention claimed is:

1. A vehicle control device comprising:
   a support mountable to surround a steering column of a vehicle and bearing vehicle controls arranged on stalks that project from lateral sides of the support;
   a steering member mounted movably with respect to the support; and
   at least one gear ratio shift member having a single end and including a base fastened rigidly to the support and a movable part mounted movably on the base and forming the single end,
   wherein the support includes a shell to surround the steering column at a location between the steering member and a dashboard of the vehicle, the shell having an elongated surface that faces the steering member.

2. The device as claimed in claim 1, wherein the at least one gear ratio shift control member extends facing an upper half of the steering member.

3. The device as claimed in claim 1, wherein the at least one control member includes a front face extending in a substantially vertical plane, the vertical plane being inclined at an inclination with respect to a direction of travel of the vehicle, in a direction away from the steering member.

4. The device as claimed in claim 3, wherein the inclination corresponds to an angle of between 60 and 80°.

5. The device as claimed in claim 1, wherein a major portion of the movable part extends in a continuation of the base.

6. The device as claimed in claim 1, wherein the movable part includes a curved peripheral edge of which a center of curvature is situated on a same side of an edge as the movable part.

7. The device as claimed in claim 1, comprising two gear ratio shift members.

8. The device as claimed in claim 1, wherein the elongated surface of the shell has a substantially polygonal profile and the at least one gear shift ratio member is fastened to the support at approximately an upper corner of the profile.

9. The device as claimed in claim 1, wherein the at least one gear ratio shift member is paddle-shaped.

10. The device as claimed in claim 1, wherein the base comprises an arm with a proximal end rigidly fastened to the support.

11. The device as claimed in claim 10, wherein the movable part is mounted movably along a distal end of the arm and fans outwardly from the distal end, a surface of the movable part that faces a front of the vehicle being fanned outwardly along a substantially vertical plane.

12. A vehicle control device, comprising:
   a support mountable to surround a steering column of a vehicle and bearing vehicle controls arranged on stalks that project from lateral sides of the support;
   a steering member mounted movably with respect to the support; and
   at least one gear ratio shift member having a single end and including a base fastened rigidly to the support and a movable part mounted movably on the base and forming the single end, the base including an arm with a proximal end rigidly fastened to the support,
   wherein the movable part is mounted movably along a distal end of the arm and fans outwardly from the distal end, a surface of the movable part that faces a front of the vehicle being fanned outwardly along a substantially vertical plane, and
   wherein, from a top view of the vehicle and with respect to a first axis that extends along a direction of travel of the vehicle through a center of the steering member and a second axis perpendicular to the first axis that intersects the first axis at the center of the steering member, the substantially vertical plane has an angle of 60 to 80° with respect to the second axis in a direction towards the front of the vehicle.

* * * * *